United States Patent
Kam et al.

[11] Patent Number: 5,999,339
[45] Date of Patent: Dec. 7, 1999

[54] HAND-HELD MAGNIFYING DEVICE

[75] Inventors: Wai Hing Kam, Laguna; Yau Chung Siu, Shatin, both of The Hong Kong Special Administrative Region of the People's Republic of China; Eric Toriumi, Buffalo Grove, Ill.

[73] Assignee: Learning Resources, Inc., Vernon Hills, Ill.

[21] Appl. No.: 09/130,759

[22] Filed: Aug. 7, 1998

[51] Int. Cl.$^6$ ..................................................... G02B 7/02
[52] U.S. Cl. ........................... 359/803; 359/802; 359/822
[58] Field of Search .................................... 359/801, 802, 359/803, 804, 805, 811, 819, 822, 381, 391, 392, 393; D16/131

[56] References Cited

U.S. PATENT DOCUMENTS

| | | | |
|---|---|---|---|
| 4,192,580 | 3/1980 | Meyer | 359/801 |
| 4,737,016 | 4/1988 | Russell et al. | 359/801 |
| 5,130,853 | 7/1992 | Sakurai | 359/803 |
| 5,844,714 | 12/1998 | DiResta | 359/368 |

*Primary Examiner*—Georgia Epps
*Assistant Examiner*—Ricky Mack
*Attorney, Agent, or Firm*—Larry L. Saret; Laff, Whitesel & Saret, Ltd.

[57] ABSTRACT

A hand-held viewer for producing a magnified image of an object has a pivotable and swivelable object mount so that an object of interest may be positioned in a plurality of orientations within the viewable area and at different distances from the lens. One presently preferred object mount comprises a yoke with spaced apart arms having slots running along their length for mounting a microscope slide or a photographic slide such as film strips or 35 mm positives. The hand-held viewer desirably includes a detachable background screen assembly to provide a contrasting background against which to view the photographic slide or other object. In a preferred embodiment, the lens may be focused by rotating a thumb-wheel within and extending partially through the body of the viewer.

25 Claims, 6 Drawing Sheets

HAND-HELD MAGNIFYING DEVICE

The present invention relates generally to magnifying devices and more particularly to hand-held viewers that allow objects to be manipulated through a range of viewing positions while being observed under magnification.

BACKGROUND OF THE INVENTION

The study of biology and other natural sciences commonly involves microscopes and magnifying glasses to view small objects of interest. Relatively inexpensive microscopes are known for educational use by children. Some such devices may be used indoors and outdoors.

One hand-held magnifying device is described in U.S. Pat. No. 4,737,016. The '016 patent discloses a hand-held magnifying device having a small body that includes a fixed magnifying lens. A slidable adjusting tube is positioned near the lens for focusing. The adjusting tube is adapted to receive an object-supporting slide or panel (carrying an object of interest) so that the slide or panel is perpendicularly oriented to the adjusting tube. The end portion of the slide or panel, which may be formed to provide a transparent enclosure to hold an insect or the like, is positioned in alignment with the lens. By sliding the adjusting tube relative to the body of the device and in a direction parallel to the axis of view, the distance between the object and the lens is varied to bring the object into focus. The adjusting tube may be rotated about its axis to move the object being viewed from left to right within the field of view. The slide may be inserted more or less deeply into the adjusting tube to position the object relative to the lens in a rectilinear manner.

The device of the '016 patent has several drawbacks. First, the '016 viewer is difficult to use in that the plunger can easily be inadvertently pressed or moved while an object is being viewed, causing the object to move out of focus. Second, the object holder cannot be angled relative to the axis of view to permit the user to easily focus on part of the object that does not present itself "full-face" in front of the lens. Third, the object holder of the '016 device has to be moved in each direction separately when positioning an object in front of the lens, which does not allow for fluid, three-dimensional movement of the object mount. Because the '016 device requires considerable manual dexterity to focus and to manipulate the object holder, it is difficult for children to use, particularly when the object observed is a moving object.

SUMMARY OF THE INVENTION

The present invention solves these problems and provides an improved hand-held viewer for viewing various living and inanimate objects under magnification. The inventive hand-held viewer comprises an elongate body having a proximal end adapted for grasping and a distal end having a bore extending transversely therethrough which houses a magnifying lens. The magnifying lens is slidably adjustable within the bore for focusing on a plurality of focal planes. In a presently preferred embodiment, the magnifying lens of the viewer is connected to a gear mechanism for moving the lens, using a conveniently located thumb-wheel on the body, allowing the user (especially children) to smoothly focus the lens.

The hand-held viewer also has a pivotable and swivelable object mount for holding and positioning an optically transparent object holder in a variety of orientations in the field of view. In a presently preferred embodiment, the object mount includes a ball joint arrangement that allows the object mount to be pivoted right, left, up and down so that the object may viewed in focus from different distances and angles relative to the axis of view. Because the ball joint is mounted on a slidable pin, the ball joint arrangement allows the user to move an object of interest from one point to another through three dimensions in an intuitive and natural motion. The movement of the object holder can be readily accomplished with one hand, leaving the other hand free to hold and focus the hand-held viewer. The objects are conveniently held for observation in a suitable object holder, such as a transparent case or on a microscope slide or the like. The object mount of the inventive hand-held viewer also may be used to view film strips, 35 mm slides, mounted specimens sealed in plastic or cellophane, or the like.

In a presently preferred embodiment of the invention, a section of the handle is removable to gain access to the interior of the body where the transparent case can be stored when not in use.

The hand-held viewer also preferably includes a light-reflective background screen. In a presently preferred embodiment, the reflective background screen, which is angled about 45° relative to the axis of view, has a white plastic surface which reflects light and presents a bright background for viewing of film strips, 35 mm slides, or objects mounted on a transparent support.

The object mount and the background screen assembly of the inventive hand-held viewer are each removable from the elongate body or handle. For example, the background screen may be removed to view 35 mm slides, film strips or other objects with direct light, instead of reflected, indirect light. And, to view very large objects, both the background screen and the object holder may be removed to allow the inventive hand-held viewer to be used as a magnifying glass or field microscope.

BRIEF DESCRIPTION OF THE DRAWINGS

FIG. 4b is a side view of the object mount of FIG. 4a;

FIG. 7 is a perspective view of an object case suitable for mounting between the arms of the object mount depicted in FIG. 4a.

DETAILED DESCRIPTION OF THE INVENTION

Figure 1:
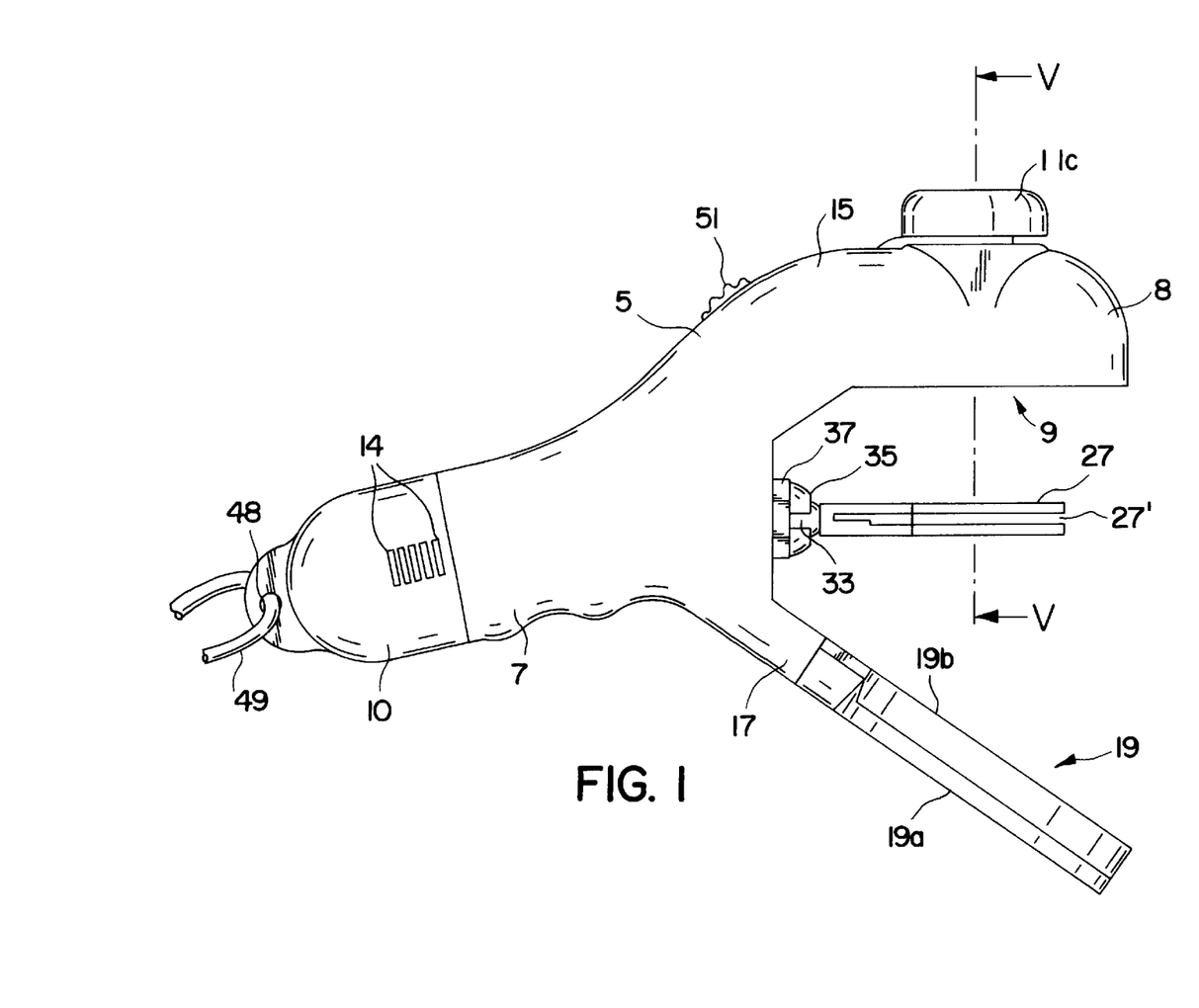
FIG. 1 is a side elevation view of a hand-held viewer in accordance with the present invention.
Figure 2:
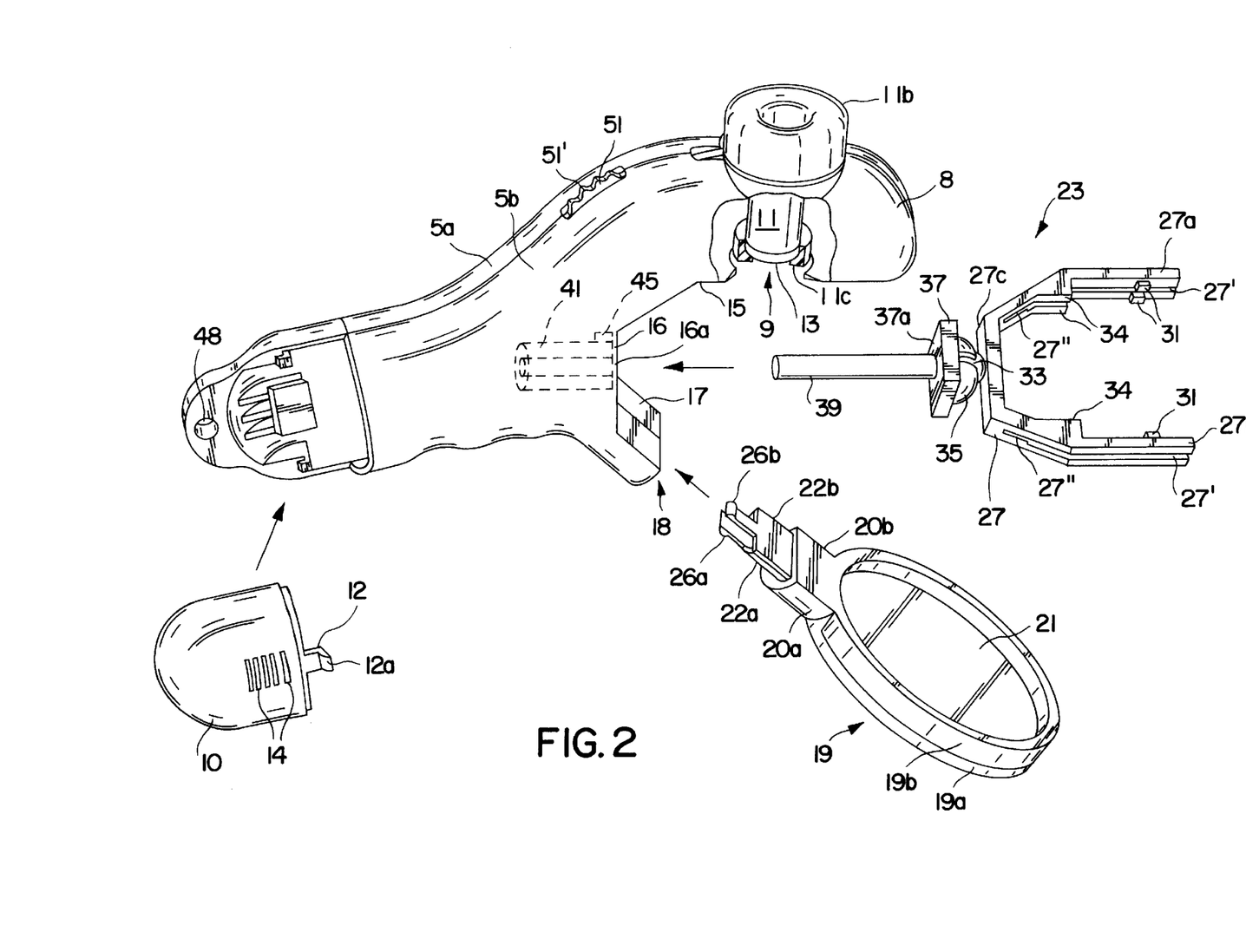
FIG. 2 is a side elevation view of the hand-held viewer (partially cut-away to show the optics housing), with the background screen assembly, the object mount assembly and the handle segment detached from the body of the viewer.
Figure 4A:
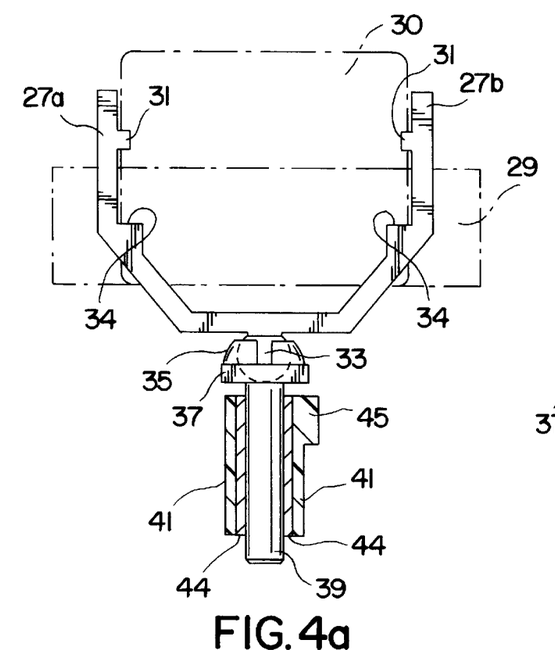
FIG. 4a is a top view of the object mount inserted into the mounting receptacle (shown in cross section) and showing in phantom lines the orientation of a mounted 35 mm slide or microscope slide.
Figure 4B:
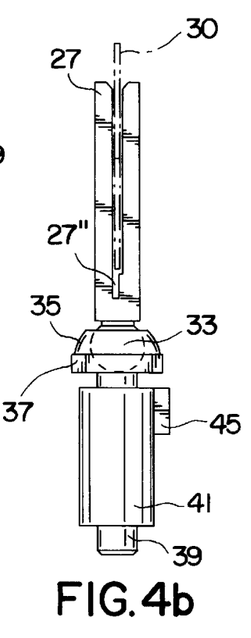
Figure 4C:
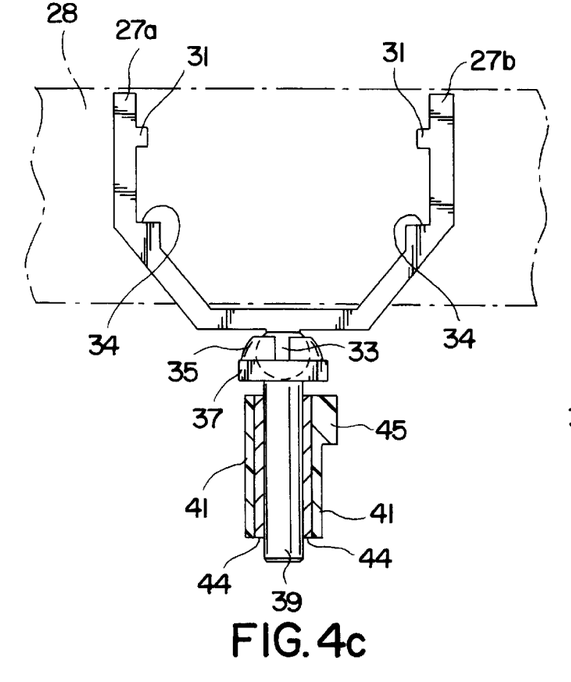
FIG. 4c is a top view of the object mount of FIG. 4a showing a slide strip mounted therein.
Figure 4D:
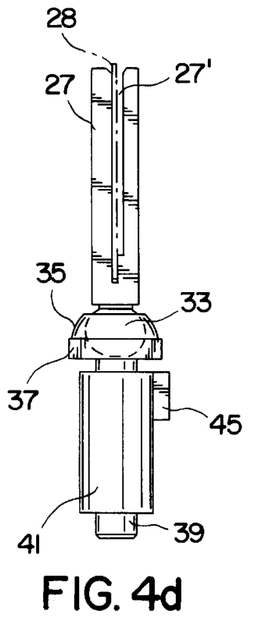
FIG. 4d is a side view of the object mount of FIG. 4c.

Referring to FIGS. 1 and 2, a hand-held viewer of the present invention includes an elongate outer body 5 having a handle portion 7 at the proximal end. A bore 9 extends transversely to and through the longitudinal dimension of the body 5 near the opposite distal end 8 of body 5. An optics housing 11, including a magnifying lens 13, is mounted within bore 9. The optics housing is slidable within bore 9 for focusing the lens on an object. In a preferred embodiment of the present invention, the body 5 of the hand-held viewer has a generally Y-shaped configuration, with the base of the "Y" forming handle 7, one arm 15 of the "Y" extending above the focusable field of view to accommodate optics housing 11, and the other shorter arm 17 extending in a direction generally below the focusable field of view. A screen assembly 19 is connected to arm 17 through an opening 18 at the end of arm 17 so as to position a background screen 21 within the field of view. A pivotable and swivelable object mount assembly 23 extends between the arms 15, 17 for holding an optically transparent object holder, such as an object case 25 (FIG. 7) or microscope slide 29 (FIGS. 4a and b). Object mount assembly 23 may also be used for holding a photographic medium, such as film strip slide 28 or 35 mm slide 30 (see FIGS. 4a–d) in the field of view of the lens.

Figure 3:
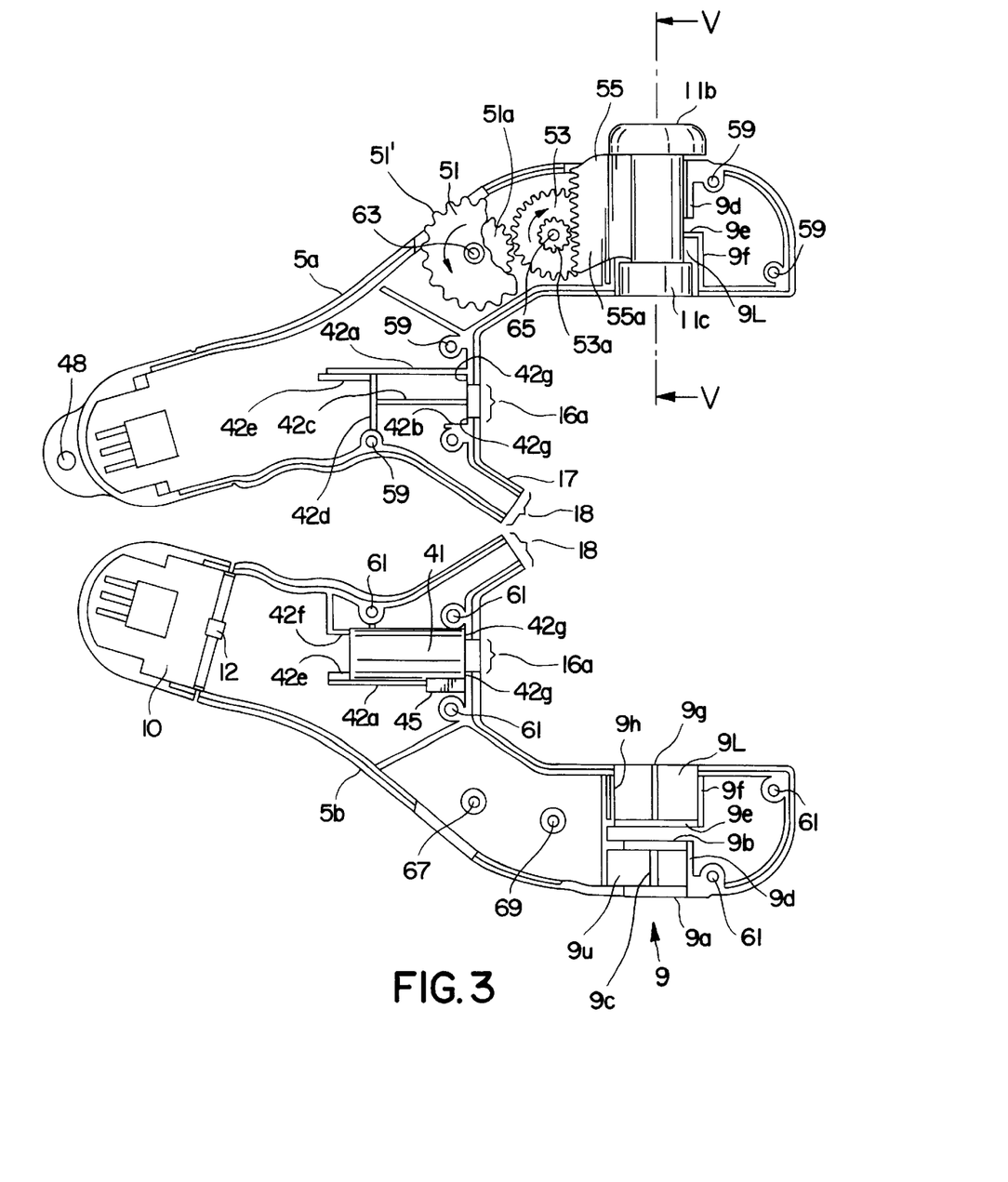
FIG. 3 is a cross-sectional view of the hand-held viewer of FIG. 1 showing the gear mechanism for focusing.

As shown in FIG. 3, body 5 comprises two mirror-image parts 5a and 5b. In a presently preferred embodiment, body parts 5a and 5b are connected to one another by a plurality of pins 59 and complementary receptacles 61 strategically positioned at points near the periphery of the body which frictionally engage each other when the body parts 5a and 5b are mated edgewise. As will be appreciated, the body parts 5a and 5b alternatively may be joined using a snap-fit arrangement or other means known in the art including sonic welding, cementing and the like.

Figure 7:
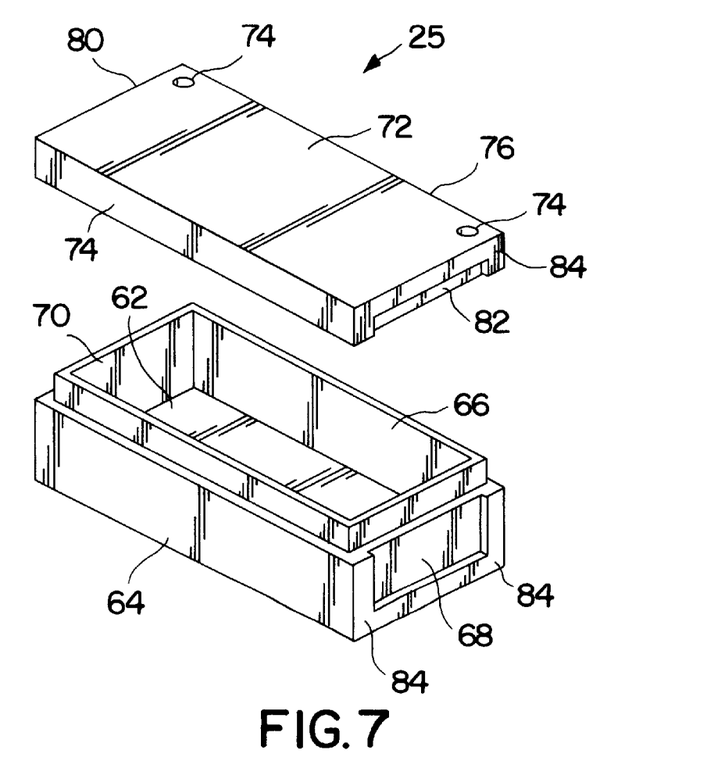

Object mount assembly 23 is attached to the body 5 at crotch 16 and extends between the arms 15, 17 of the body. Referring to FIGS. 1, 2 and 4a–d, in a particularly preferred embodiment of the present invention, the object mount assembly 23 comprises a yoke 27 with spaced-apart arms 27a and 27b positioned to hold transparent case 25, microscope slide 29, film strip slide 28, 35 mm slide 30, or the like. To accommodate microscope slide 29, arms 27a and 27b of the yoke include slots 27' extending longitudinally. The slots 27' provide a gap that is sized to frictionally secure a microscope slide 29 or 35 mm slide 30 near its lateral edges, with the central portion of the slide centered side-to-side within the yoke. To accommodate film strip slide 28, slots 27' have an incrementally reduced gap 27" near the base 27c of yoke 27 to position the film strip substantially perpendicular to the axis of view V.

Where the viewed object dictates use of object case 25, depicted in FIG. 7, such as when the object to be viewed is not planar or mounted on a slide (e.g., an insect or spider), the arms of yoke 27 are provided with opposing tabs 31 to engage the endwalls of transparent object case 25. The arms 27a and 27b are spaced apart by an amount that is slightly less than the length of object case 25 and are resiliently deflectable so that tabs 31 on arms 27a and 27b are spring-biased against the endwalls 32 of object case 25. With reference to FIG. 7, a particularly preferred object case 25 includes (i) a container portion having a bottom wall 62, a pair of upstanding sidewalls 64, 66 and a pair of upstanding endwalls 68, 70; and (ii) a lid, sized to mate with the container portion, having a top wall 72, with airholes 74 therethrough, a pair of upstanding sidewalls 76, 78 and a pair of upstanding endwalls 80, 82. The endwalls 68, 70, 80 and 82 of the container and lid are slightly recessed relative to the edges of top wall 72, bottom wall 62 and respective sidewalls 64, 66, 76 and 78 to form a raised lip 84 around the perimeter of the endwalls. Lip 84 prevents object case 25 from accidentally sliding out of yoke 27 because arms 27a and 27b will not easily separate far enough to permit the lip to slide past tabs 31. Additionally, opposing shoulders 34 are provided on arms 27a and 27b of the yoke to stabilize object case 25 when object case 25 is fully inserted therein so that a wall of object case 25 (e.g., 64, 66 62, or 72) abuts and engages shoulders 34.

A particularly preferred embodiment of a pivotable object mount assembly 23 has a ball joint arrangement, with a ball member 33 located at and integrally molded to the base 27c of yoke 27. Ball member 33 is rotatable within a socket member 35 formed on adjoining base plate 37. The back side 37a of base plate 37 includes an elongate pin member 39 extending perpendicularly therefrom to facilitate attachment of the object mount assembly 23 to housing 5. In a preferred embodiment, and as shown in FIG. 1, the ball joint assembly allows the yoke, and the object captured by it, to be pivoted in any direction left, right, up or down through a range of positions up to an angle of about 25° relative to the yoke's centered position, as well as to turn 360° circularly about the axis extending between arms 27a and 27b. By "centered position" it is meant that yoke 27 is positioned directly under the lens with arms 27a and 27b being equidistant from the axis of view V, and the plane defined by arms 27a and 27b is perpendicular to the axis of view V, as shown in FIG. 1. As will be appreciated, a three-dimensional range of motion of yoke 27 is provided in this embodiment, as the yoke is both pivotably adjustable (analogous to the range of motion of a joystick) as well as slidably adjustable along the axis of pin 39, which is perpendicular to axis of view V. In addition, pin 39 can be rotated within receptacle 41, although that range of motion is also available by rotating yoke 27 within ball and socket members 33, 35. Thus, an object of interest held by yoke 27 within the field of view may be placed in a plurality of positions and viewed from different angles, with the maximum degree of pivoting depending in part upon the dimensions of the socket and ball attached to the yoke. With this range of motion, essentially all points within transparent object case 25 or on a slide may be viewed.

Figure 8:
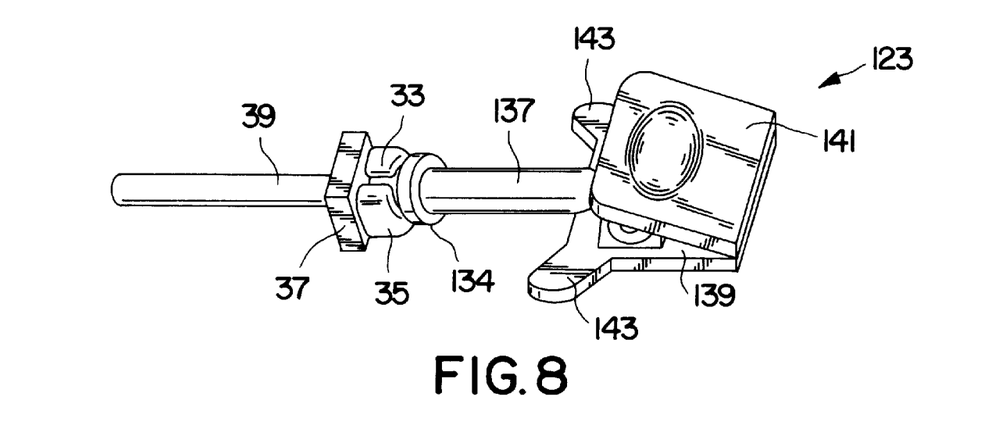
FIG. 8 is a perspective view of an object clip assembly including an alligator type clip.

Another embodiment of an object mount is shown in FIG. 8. In this embodiment, an object clip assembly 123 includes a ball joint arrangement similar to that of object mount assembly 23 with ball member 33 being seated in socket 35. Ball member 33 is attached to one side of a disk 134, and a shaft 137 extends from the opposite side of disk 134 and terminates in an alligator-type clip. The alligator clip includes a bottom jaw 139 and a top jaw 141 which is spring biased against bottom jaw 139. Bottom jaw 139 includes a pair of handles 143 for pivoting and swiveling object clip assembly 123 through a range of positions analogous to those of object mount assembly 23. In this embodiment of the present invention, object clip assembly 123 is used to hold within the field of view of the lens 13 relatively rigid and larger objects (e.g., a piece of wood or a leaf) than can be contained within object case 25.

Object mount assembly 23 (or object clip assembly 123) is slidingly attached to the hand-held viewer of the invention by pressing pin 39 into mating sleeve or receptacle 41. As seen in FIGS. 2 and 3, receptacle 41 is positioned in an interior space of housing 5 so that it is aligned with the opening 16a at crotch 16 to receive pin 39. As best seen in FIG. 3, receptacle 41 is positioned between internally formed top wall 42a, bottom wall 42b, side walls 42c and 42d, back walls 42e and 42f and front wall 42g. Complementary halves of the walls 42a–g are provided on each half of the body 5 (i.e., on the inside of body parts 5a and 5b) so that the walls are completed, and receptacle 41 is caged therebetween, when body parts 5a and 5b are joined. Side wall 42d is radiused to form a bore having a diameter slightly larger than the outer diameter of receptacle 41 when body 5 is assembled. Thus, "complementary radiused walls," as used herein, means walls that, when mated edgewise, form a bore. Receptacle 41 includes a radially projecting tab 45 that "locks" into an opening in top wall 42a when the two halves of body 5 are assembled. This prevents relative rotation of receptacle 41 when the pivotable object mount is manipulated. As shown in cross section in FIGS. 4a–d, receptacle 41 preferably is slightly overbored (relative to the diameter of pin 39) and lined with a length of resiliently compressible material 44, such as the loop portion of hook and loop fastener material, frictional nylon or other suitable fabric for providing slightly frictional resistance to the sliding of pin 39 within receptacle 41. Pin 39 may be longer than receptacle 41 to accommodate the sliding adjustment along the axis of pin 39 while maintaining a substantial length of pin 39 within the bore of receptacle 41. When the viewer is not being used, object mount 23 may be detached from receptacle 41 for storage.

Figure 5:
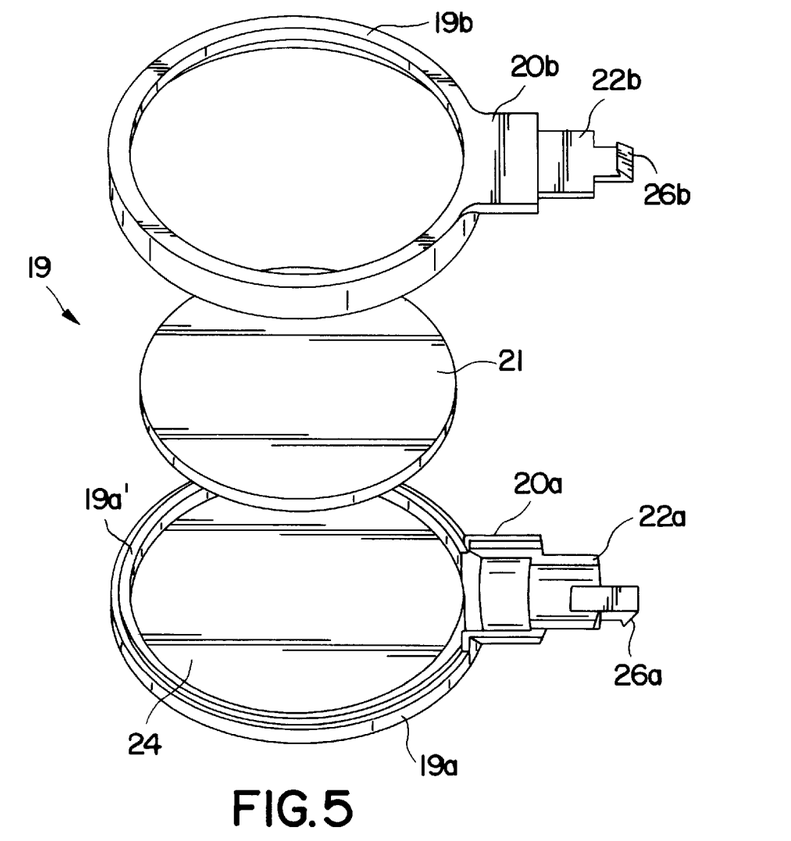
FIG. 5 is an exploded view in perspective of the background screen assembly of the handheld viewer of FIG. 1.

Turning to FIG. 5, a presently preferred embodiment of the invention also includes a detachable screen assembly 19 which, as noted above, mates with opening 18 in housing arm 17 to properly locate the screen assembly 19 in the field of view of lens 13. Screen assembly 19 preferably is sized to completely fill the field of view. Screen assembly 19 comprises: (i) a disk-shaped base 19a having a raised annular lip 19a' extending substantially around the periphery thereof and defining a centrally located cavity 24 in base 19a; (ii) a disk-shaped, reflective background screen 21 that is sized and shaped to seat on lip 19a'; and (iii) a circular frame member 19b that mates with base 19a to hold the circumferential edges of background screen 21 between base 19a and circular frame member 19b. Base 19a and circular frame member 19b may be mated to capture background screen 21 using a suitable adhesive or other bonding method such as ultrasonic welding. Background screen 21 is preferably a rigid, light-reflective plastic structure such as may be provided by a white, plastic disk.

With reference to FIGS. 2 and 5, base 19a and circular frame member 19b each have with spacer arms 20a and 20b respectively, which extend radially therefrom to position the background screen within the field of view. To facilitate attachment of screen assembly 19 to arm 17, tongue members 22a and 22b extend from spacer arms 20a and 20b and terminate with ridges 26a and 26b. Tab members 22a and 22b each terminate in resiliently deflectable fingers spaced apart from one another and include ridges 26a and 26b. The ridges frictionally engage the interior surface of arm 17 so as to provide attachment when screen assembly 19 is installed on arm 17. Optionally, detents may be provided on the interior surface of arm 17 to reversibly engage ridges 26a and 26b.

With further reference to FIGS. 2 and 3, in a particularly preferred embodiment of the present invention, a gear assembly advances and retracts optics housing 11 within bore 9 of the viewer. The gear assembly allows a user to easily focus lens 13 using the thumb of the same hand that grasps handle 7. The gear assembly includes a first gear member 51, a second gear member 53 and a third gear member 55. First gear 51 has a knurled circumferential edge 51' to facilitate operation by the thumb of the user . A small pinion gear 51a is coaxially aligned and integrally formed with first gear member 51. The small pinion gear 51a has a diameter of approximately 2 centimeters. First gear member 51, which has a diameter of approximately 3 centimeters at its knurled edge, is mounted on pin 63 positioned perpendicularly to the interior of body 5. A portion of the circumferential edge 51' of the first gear member protrudes through a slot in housing 5 for access by the user and manual operation of the gear mechanism.

The second gear member 53 is approximately 2½ centimeters in diameter and also has a small pinion gear 53a (approximately 1 centimeter in diameter) coaxially aligned with and integrally formed with second gear 53. Second gear member 53 is mounted on pin 65 positioned perpendicularly to the interior of body 5.

The third gear member 55 is a linear gear (or rack) which is attached to the outer surface 50 of optics housing 11. The teeth of third gear member 55 are aligned parallel to the axis of view V. Third gear member 55 is approximately 3 centimeters in length. In a preferred embodiment, third gear member 55 is integrally molded to a spacer fin 55a, which in turn is integrally molded to optics housing 11 so that the teeth of third gear member 55 are located about 1.5 centimeters from the outer surface 50 of the optics housing.

The interrelationship and cooperation of the various gears that comprise the gear assembly are such that first pinion gear 51a operatively engages second gear member 53, and second pinion gear 53a operatively engages linear gear member 55. Thus, when first gear 51 is manually rotated by the user, the relative rotation is translated through first pinion gear 51a, second gear member 53, and second pinion gear 53a into linear movement of the third gear member 55. Because third gear member 55 is connected to optics housing 11, the optics housing 11 moves linearly along the axis of view V to permit the focusing of lens 13.

Figure 6:
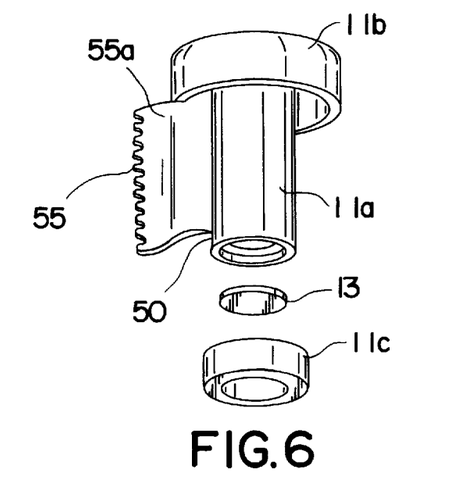
FIG. 6 is an exploded view of the optics housing of the hand-held viewer of FIG. 1.

Referring to FIG. 6, the optics assembly 11 of the hand-held viewer comprises a lens 13, a generally cylindrical, hollow housing 11a having an enlarged upper portion 11b that is rounded to form an eye piece, and an annular flange 11c. Lens 13 has an outer diameter that is essentially the same as the outer diameter of housing 11a. Lens 13 fits into annular flange 11c, which in turn fits onto the bottom of tube 11a to capture lens 13 within the housing 11. Flange 11c may be connected to the lower end of housing 11a by cement, threads, or other suitable means. Convex magnifying lens 13 is formed from a optically transparent material (e.g., glass, polycarbonate, etc.). The magnification or "power" of lens 13, which depends in part on the convexity of the lens as known in the art, will preferably be between about 4× and 7×, with a presently preferred magnifying lens 13 having a power of about 7×.

As mentioned above, the optics housing is slidable within bore 9. With further reference to FIG. 3, body 5 has internally formed, radiused walls 9a and 9b and side walls 9c and 9d, which together define an upper bore 9U sized to slidingly receive the housing 11a of optics assembly 11. Body 5 also has internally formed, radiused walls 9e and side walls 9f, 9g and 9h, which together define a lower bore 9L sized to slidingly receive annular flange 11c. Annular flange 11c has an outer diameter that slides within lower bore 9L, but is too large to enter incrementally reduced upper bore 9U. The diameter of eye piece 11b is larger than the diameter of upper bore 9U. Thus, eye piece 11b and flange 11c act as mechanical "stops" for the linear movement of optics assembly 11 and define the focusing limits of optics assembly 11. Thus, the optics assembly 11 remains within bore 9 when the viewer is focused.

In a particularly preferred embodiment of the present invention, a handle segment 10 is detachable, using frictional, detent or other well known means, to expose the interior space within the handle 7. This is best seen in FIG. 2. Handle segment 10 has an L-shaped tab 12 having a ridge 12a at its free end which reversibly engages a detent (not shown) on the inside surface of handle 7. Thus, handle segment 10 snap-fits into place to complete the handle 7. The outer surface of handle segment 10 has a plurality of grooves 14 to provide a friction surface to facilitate removal of handle segment by sliding it rearwardly. The interior space within handle 7 of the viewer is available to store an object case 25 and/or microscope slides 29.

Handle 7 also includes an eyelet 48 at its distal end for attachment of a neck strap 49 for carrying the inventive hand-held viewer.

The various parts of the hand-held viewer of the invention can be preferably made by an injection molding process using a suitable plastic such as ABS (acrylonitrile butadiene styrene), HIPS or the like, as well known in the art.

The foregoing describes a particularly preferred embodiment of the invention. It will be apparent to those skilled in the art that modifications may be made without departing from the spirit and scope of the invention. Accordingly, it is not intended that the invention be limited except as may be necessary in view of the appended claims.

The invention claimed is:

1. A hand-held viewer for viewing an object under magnification, comprising:
   (a) a body having a first end for grasping and a second end for viewing;
   (b) a magnifying lens secured to the second end and movable relative thereto, and
   (c) an object mount for holding an object within the focus of the lens, the object mount being pivotably attached to and slidably moveable relative to the body so that the object held by the object mount may be positioned in a plurality of orientations and at different distances relative to the lens.

2. A hand-held viewer according to claim 1, wherein the object mount includes a ball joint.

3. A hand-held viewer according to claim 2, wherein the object mount has a pair of opposing arms.

4. A hand-held viewer according to claim 3, wherein each arm of the object mount includes a slot.

5. A hand-held viewer according to claim 3, wherein the arms of the object mount have tabs.

6. The hand-held viewer of claim 1 wherein the object mount includes an elongate pin having a longitudinal axis extending toward the body, wherein the body includes a receptacle having a resiliently compressible interior surface for receiving the pin, the pin and receptacle permitting rotational movement of the object mount relative to the body and slidable movement of the object mount along the longitudinal axis of the pin.

7. A hand-held viewer for viewing an object under magnification, comprising:
   (a) a body having a Y-shaped configuration including a first arm and an intersecting second arm, the body having a bore located near an end of the first arm and extending transversely therethrough,
   (b) a tube slidably mounted in the bore,
   (c) a magnifying lens fixed in the tube for magnifying an object within a field of view;
   (d) a background screen assembly connected to the second arm and having a light-reflective surface within the field of view;
   (e) an object mount slidably attached to the body near the intersection of the first and second arms and extending therebetween; and
   (f) a gear mechanism operatively connected to the tube for slidably adjusting the tube in the bore.

8. A hand-held viewer according to claim 7, wherein at least a portion of the gear mechanism extends outside the body.

9. A hand-held viewer according to claim 7, wherein the object mount comprises a pair of opposing arms and a ball joint between the opposing arms and the body.

10. A hand-held viewer for viewing an object under magnification, comprising:
    (a) a body having a first end for grasping and a second end for viewing;
    (b) a magnifying lens secured to the second end and movable relative thereto;
    (c) an object mount for holding an object within the focus of the lens, the object mount being pivotably attached to the body so that the object may be positioned in a plurality of orientations and at different distances relative to the lens, and
    (d) an adjustment means for slidably moving the lens relative to the object mount, wherein the adjustment means comprises a rotatable gear and a plurality of teeth on the optics housing in engagement with the rotatable gear.

11. A hand-held viewer for viewing an object under magnification, comprising:
    (a) a body having a first end for grasping and a second end for viewing;
    (b) a magnifying lens secured to the second end and movable relative thereto;
    (c) an object mount for holding an object within the focus of the lens, the object mount being pivotably attached to the body so that the object may be positioned in a plurality of orientations and at different distances relative to the lens, the object mount including a cylindrical pin slidingly engageable with the body, and
    (d) an adjustment means for slidably moving the lens relative to the object mount, wherein the adjustment means comprises a rotatable gear and a plurality of teeth on the optics housing in engagement with the rotatable gear, wherein the rotatable gear extends at least partially outside the body.

12. A hand-held viewer for viewing an object under magnification, comprising:
    (a) a body defining an interior space and having a first end for grasping and a second end having a bore extending transversely therethrough;
    (b) a tube having a central axis and being slidable within the bore;
    (c) a magnifying lens positioned in the tube for viewing along the central axis;
    (d) adjusting means for slidingly adjusting the position of the tube within the bore, at least a portion of the adjusting means positioned in the interior space of the body; and
    (e) an object mount pivotably attached to the body near the lens and moveable through a circle in front of the lens.

13. A hand-held viewer according to claim 12, wherein the adjusting means is a gear mechanism.

14. A hand-held viewer according to claim 13, wherein the gear mechanism includes a linear gear attached to the tube.

15. A hand-held viewer according to claim 12, wherein the object mount includes a ball joint.

16. A hand-held viewer according to claim 15, wherein the object mount has a pair of spaced opposing arms.

17. A hand-held viewer according to claim 16, wherein each arm of the object mount includes a slot extending longitudinally along the arm.

18. A hand-held viewer according to claim 16, wherein the arms of the object mount each have tabs projecting toward the other arm.

19. A hand-held viewer according to claim 14, wherein the linear gear is integrally formed on the tube.

20. A hand-held viewer according to claim 12, further comprising a background screen assembly having a light-reflective surface, the background screen assembly extending from the body so as to position the appearance surface in the field of view of the lens.

21. A hand-held viewer according to claim 20, wherein the background screen assembly is detachable from the body.

22. A hand-held viewer for viewing an object under magnification, comprising:
   (a) a body having a first end for grasping and a second end for viewing;
   (b) a magnifying lens secured to the second end and movable relative thereto;
   (c) an object mount for holding an object within the focus of the lens, the object mount being pivotably attached to the body so that the object may be positioned in a plurality of orientations and at different distances relative to the lens, and
   (d) a background screen assembly extending from the body and positioned opposite the object mount from the lens.

23. A hand-held viewer for viewing an object under magnification, comprising:
   (a) a body having a first end for grasping and a second end for viewing;
   (b) a magnifying lens secured to the second end and movable relative thereto;
   (c) an object mount for holding an object within the focus of the lens, and
   (d) a background screen assembly extending from the body and positioned opposite the object mount from the lens, wherein the background screen assembly is detachable from the body.

24. A hand-held viewer according to claim 23, further comprising an optics housing and an eyepiece, said magnifying lens mounted within said optics housing.

25. A hand-held viewer for viewing an object under magnification, comprising:
   (a) a body having a first end for grasping and a second end for viewing;
   (b) a magnifying lens secured to the second end and movable relative thereto;
   (c) an object mount for holding an object within the focus of the lens, the object mount being pivotably attached to the body so that the object may be positioned in a plurality of orientations and at different distances relative to the lens, and
   (d) an adjustment means for slidably moving the lens relative to the object mount.

* * * * *